United States Patent [19]

Driessen et al.

[11] Patent Number: 4,954,986

[45] Date of Patent: Sep. 4, 1990

[54] METHOD AND APPARATUS FOR STORING DIGITAL DATA REPRESENTING A TOPOLOGICAL NETWORK

[75] Inventors: Leonardus M. H. E. Driessen; Cornelis P. Janse, both of Eindhoven, Netherlands

[73] Assignee: U.S. Philips Corporation, New York, N.Y.

[21] Appl. No.: 224,087

[22] Filed: Jul. 25, 1988

[30] Foreign Application Priority Data

Jul. 23, 1987 [NL] Netherlands .......................... 8701738

[51] Int. Cl.$^5$ ............................................. G11C 13/00
[52] U.S. Cl. ............................ 365/189.01; 365/230.01
[58] Field of Search ...................... 365/189.01, 189.02, 365/189.04, 189.05, 230.01, 230.03, 230.09, 238, 238.5

[56] References Cited

U.S. PATENT DOCUMENTS 4,658,377 4/1987 McElroy ......................... 365/189.01

OTHER PUBLICATIONS

X. Lin et al: "Efficient Diagram Understanding with Characteristic Pattern Detection", Computer Vision, Graphics, and Image Processing, vol. 30, No. 1, Apr. 1985, pp. 84–106, Academic Press, Inc.
A. C. Shaw: "Parsing of Graph-Representable Pictures", Journal of the Association for Computing Machinery, vol. 17, No. 3, Jul. 1970, pp. 453–481.
H. Doi: "Graph-Representation of Developmental System: Its Application to Ascidian Embryogenesis", Fujitsu Scientific 7 Technical Journal, vol. 21, No. 5, Dec. 1985, pp. 482–493.

Primary Examiner—Terrell W. Fears
Attorney, Agent, or Firm—Jack D. Slobod; Jack E Haken; Thomas A. Briody

[57] ABSTRACT

A method of storing in a memory digital data representing a topological network having a set of nodes (0-cells), segments (1-cells), and areas (2-cells) within concatenated 1-cells. For each 1-cell there are stored an associated first 0-cell and second 0-cell and also a thread pointer assigned to the 0-cells. The thread pointer of an 0-cell indicates the next-following 1-cell obtained by rotating the 1-cell in question in a predetermined direction of rotation around such 0-cell. For finding a 2-cell, use is made of a first 1-cell and the thread pointer associated with one of its 0-cells is followed after which, starting from the newly found 1-cell, each time the thread pointer of the opposite 0-cell is used until the first 1-cell is found again.

10 Claims, 4 Drawing Sheets

| 1-cell | first node | | 2nd node | | 2-cell L | 2-cell R |
|---|---|---|---|---|---|---|
| | 0-cell | thread-pointer | 0-cell | thread-pointer | | |
| a | 1 | c | 2 | b | A | E |
| b | 2 | d | 3 | b | A | B |
| c | 1 | a | 4 | g | E | A |
| d | 2 | a | 6 | e | B | E |
| e | 6 | d | 5 | f | B | E |
| f | 3 | b | 5 | g | C | B |
| g | 4 | h | 5 | e | E | C |
| h | 4 | c | 3 | f | C | A |

FIG. 6A

| 1-cell | 1st node | | 2nd node | | 2-cell L | 2-cell R |
|---|---|---|---|---|---|---|
| | 0-cell | t.p. | 0-cell | t.p. | | |
| k | 10 | t | 11 | m | R | W |
| m | 11 | s | 12 | r | R | R |
| r | 12 | r | 12 | m | R | Q |
| s | 11 | k | 13 | v | R | W |

FIG. 6B

| 1-cell | 1st node | | 2nd node | | 2-cell L | 2-cell R |
|---|---|---|---|---|---|---|
| | 0-cell | t.p. | 0-cell | t.p. | | |
| k | 10 | t | 11 | m | R | W |
| m | 11 | s | 12 | $r_1$ | R | R |
| $r_1$ | 12 | $r_2$ | 14 | $r_2$ | R | Q |
| $r_2$ | 14 | $r_1$ | 12 | m | R | Q |
| s | 11 | k | 13 | v | R | W |

FIG. 6C

METHOD AND APPARATUS FOR STORING DIGITAL DATA REPRESENTING A TOPOLOGICAL NETWORK

BACKGROUND TO THE INVENTION

The invention relates to a method and apparatus for storing in a memory digital data representing a surface-wise-organized topological network, which network contains a set of nodes and segments, each segment having a memory location at which is stored data representing a first and a second node terminating such segment, inclusive of thread pointer data per node indicating a single further segment terminated by such node, each node terminating a subset of segments arranged in a sequence of successive orientations.

EXEMPLARY PRIOR ART

A method of this kind is known from the article "A Tiger for tomorrow" by R. H. Moore, published in the proceedings of "Joint symposium for urban data management systems and the spatially oriented referencing systems association" (June 3, 1985, The Hague, The Netherlands). In such article, a 0-cell corresponds to a node or point, a 1-cell corresponds to a chain or curve segment and a 2-cell corresponds to an area within concatenated chains. According to the known method, for each 1-cell of the topological network there is stored a first and a second 0-cell which indicate the starting point and the end point of the 1-cell. A thread pointer indicating an arbitrary further 1-cell terminating the relevant 0-cell is then non-systematically assigned to the relevant 0-cell. In order to recognize the topology, further data are also stored for the respective 1-cell, for example, the 2-cells to the left and to the right of the relevant 1-cell, and also thread pointers assigned to these 2-cells.

It is a drawback of the known method that the thread pointer assigned to a 0-cell indicates an arbitrary further 1-cell which terminates the relevant 0-cell. As a result of this arbitrary choice, the assignment of thread pointers is neither systematic nor structured. Consequently, to establish the topology of the network from the table containing the 1-cells, additional storage space would be required for storing further data representing the topology. This additional storage space therefore, would not be available for other purposes.

SUMMARY OF THE INVENTION

Among other things, it is an object of the invention to provide a method for storing digital data representing a topological network in a memory, the thread pointers being systematically assigned to the 0- cells in a structured manner.

To achieve this, according to one of its aspects a method in accordance with the invention is characterized in that the thread pointer data assigned to a 0-cell indicates a 1-cell of next-following orientation in a set according to a particular sense of rotation, and in that said sense is uniform for all 0-cells in the set.

As a result of the rotation in a predetermined direction, the choice of the 1-cell to be indicated by the thread pointer is defined and hence also the choice of the thread pointer. This systematic approach introduces additional information so that data concerning the topology are also stored. Because a thread pointer thus always indicates a next 1-cell obtained by rotation in the predetermined direction, all 1-cells adjoining the relevant 0-cell are found so that the topology is known.

In topological networks in which at least one 1-cell is formed by a closed loop, the first and the second 0-cell associated with such a 1-cell are identical. In order to simplify the treatment of such closed loops, preferably a virtual 0-cell is provided at a point of a closed loop, which points differs from a junction 0-cell which indicates the connection of the relevant closed loop to a further 1-cell of the network, the closed loop being stored as a first and a second sub-1-cell, the first and the second 0-cell indicated for the first sub-1-cell being formed by the junction 0-cell and the virtual 0-cell, respectively, the first and the second 0-cell indicated for the second sub-1-cell being formed by the virtual 0-cell and the junction 0-cell, respectively.

It is a further object of the invention to provide a method for finding the 1-cells and the 0-cells which bound a particular 2-cell, in a topological network containing a set of 0-cells, 1-cells and 2-cells, stored in a memory, use being made of the systematic and structured approach used for the storage of the 1-cells.

In order to achieve this, according to a further aspect said method in accordance with the invention is characterized in that, on the basis of a fist set formed by a first 1-cell of the network and one of its terminating 0-cells, there is formed a second set by addressing said first 1-cell in the memory and by selecting the other 0-cell terminating said first 1-cell and also the 1-cell indicated by the thread pointer assigned to said other 0-cell, said second set being used to form a third set by addressing the 1-cell of the second set in the memory, by taking that 0-cell terminating the addressed 1-cell which is not the 0-cell used for the second set, and by taking the 1-cell indicated by the thread pointer assigned to the latter other 0-cell, which third set is subsequently compared with the first set and, in the case of correspondence, the searched 2-cell is bounded by the first and the second set, while in the case of non-correspondence the second set is buffered and subsequently substituted by the third set in order to form, on the basis of the substituted second set, a further third set, which operations are repeated until the first set corresponds to a third set thus formed.

By selecting each time the other 0-cell, the other end of the 1-cell is reached and by selecting, for the formation of a set, each time that 1-cell which is indicated by the thread pointer assigned to said other 0-cell, the contours of the 2-cell to be found are recognized. Because of the choice made for the assignment of the thread pointer, the 1-cell indicated by the thread pointer will always be that 1-cell which adjoins the contour to be formed; as a result, the contour of the 2-cell will be quickly recognized because it is not necessary to fetch additional data representing the topology. When the first and the third set correspond, it follows immediately that the 2-cell to be found is contoured.

When the storage of the network does not include the use of virtual 0-cells for subdividing 1-cells formed by closed loops into sub-1-cells, preferably a second set is formed on the basis of a first set formed by a first 1-cell of the network and one of its terminating 0-cells by selecting the other 0-cell terminating said first 1-cell and also the 1-cell indicated by the thread pointer assigned to said other 0-cell, the 1-cell of the second set being subsequently addressed in the memory and the data fetched being examined in order to determine whether the first and the second 0-cell terminating the relevant 1-cell are identical, a third set being formed when the first and the second 0-cell are identical, which third set is formed by selecting the identical 0-cell and also the 1-cell, indicated by the thread pointer assigned to one of the two 0-cells, which differs from the 1-cell of the second set, in the case of non-identical first and second 0-cells the third set being formed by taking the other 0-cell terminating the addressed 1-cell which is not the 0-cell used in the second set and by taking also the 1-cell indicated by the thread pointer assigned to the latter other 0-cell, which third set is subsequently compared with the first set and, in the case of correspondence, the 2-cell is bounded by the first and the second set, while in the case of non-correspondence the second set is buffered and subsequently substituted by the third set in order to form a further third set on the basis of the substituted second set, said operations being repeated until the first set corresponds to a third set thus formed.

The search for identical first and second 0-cells immediately reveals whether the relevant 1-cell forms a closed loop. This is because the starting point and the end point of closed loops coincide. By forming the third set by means of one of the two 0-cells and that 1-cell which is indicated by the thread pointer assigned to one of the two 0-cells and which differs from the 1-cell of the second set, in the case of identical first and second 0-cells it is avoided that the same 1-cell is selected again and again to ensure that rotation within the closed loop does not take place.

Preferably, the first 1-cell of the first set in the memory is addressed and on the basis of the data fetched it is examined whether the first and the second 0-cell terminating the first 1-cell are identical, the 2-cell in question being that one which is enclosed by the first 1-cell in the case of identical first and second 0-cells.

Thus, it can be directly determined whether the 1-cell of the first set forms a closed loop.

The invention also relates to a device for performing the method for finding the 1-cells and 0-cells which bound a 2-cell. A device in accordance with the invention is characterized in that the topological network is stored in the memory, the device comprising an address generator for generating memory addresses for the addressing of the 1-cells indicated in the first and second set, and a comparator for performing a comparison operation between said first and third sets.

The device in accordance with the invention can be used notably in a vehicle navigation system which comprises a position determining unit for determining position coordinates of the vehicle and also a converter for converting position coordinates in a first system.

The invention also relates to a memory containing digital data representing a topological network, stored according to the invention. In accordance with the invention a CD-ROM is employed.

BRIEF DESCRIPTION OF THE FIGURES

The invention will be described in detail hereinafter with reference to the drawings; therein:

FIGS. 6a, b and c are memory tables of topological network data.

DESCRIPTION OF A PREFERRED EMBODIMENT

Figure 1:
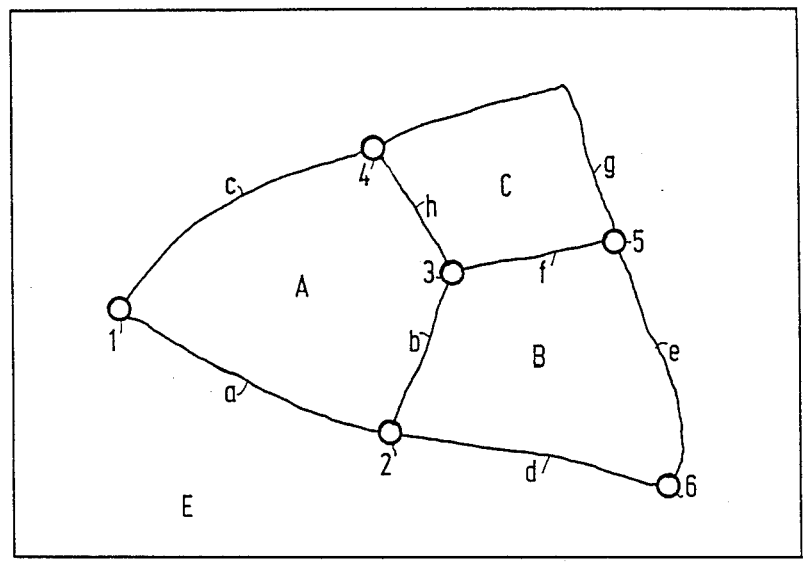
FIG. 1 shows an example of a topological network.

FIG. 1 shows an example of a topological network. This network is, for example, a network of roads as presented on a road map, a town map, a railway network, or the wiring of an electronic circuit. For the sake of simplicity it will be assumed that the network is a road network or a town map. The numerals 1, 2, ... , 6 denote intersections and the letters a, b, c, d, e, f, g and h denote a respective road section which is terminated by two intersections. For example, the road section b is terminated by the intersections 2 and 3. In order to define also an orientation for the various road sections, a starting point and an end point is indicated for each road section. For example, the intersection 1 is the starting point of the road section c and the intersection 4 forms the end point. In topological networks such intersections are denoted as 0-cells and the road sections are referred to as 1-cells. In general, an n-cell represents a consecutive, n-dimensional, geometrical object. A surface area enclosed by road sections thus forms a 2-cell. In the network shown in FIG. 4 four 2-cells are shown, that is to say the 2-cells A, B, C and E. The 2-cell A is enclosed by the 1-cells a, b, h and c and by the 0-cells 1, 2, 3 and 4.

When such a network is to be stored in digital form in a memory, for example, an optical disc such as a CD-ROM, in order to enable processing by means of a computer, for example in a vehicle navigation system, it is not only necessary to store the various 0-cells, 1-cells and 2-cells, but the relations between these various cells must also be known. This is because it must be possible to deduce the topology of the network from the data stored.

FIG. 6a shows an example of the contents of a memory table in which the data of the topological network shown in FIG. 1 is stored. The first column of this table contains a list of all 1-cells in alphabetical order. Each 1-cell thus forms as it were an address for a memory location. For each given 1-cell there is included a first 0-cell and a second 0-cell which form the starting point and the end point, respectively, of the road section associated with the relevant 1-cell. For example, for the 1-cell a, the 0-cells 1 and 2 are included as the first 0-cell and the second 0-cell, respectively. Preferably, the 0-cell having the smallest X-coordinate (extreme left) is chosen as the starting point; in case of equal X-coordinates, the 0-cell having the smallest Y-coordinate is chosen as the starting point. Furthermore, for the first 0-cell and the second 0-cell associated with the given 1-cell there is a thread pointer. Such a thread pointer indicates a further 1-cell which adjoins the 0-cell whereto the thread pointer has been assigned.

In a method in accordance with the invention, the assignment of a thread pointer is realized by selecting the clockwise next-following 1-cell in a sequence of successive orientations corresponding to the subset of 1-cells terminated by the 0-cell in question. It will be evident that the direction of rotation could also be counter-clockwise and that clockwise or counter-clockwise represents a predetermined choice. For the described embodiment clockwise rotation will be chosen.

Figure 2:
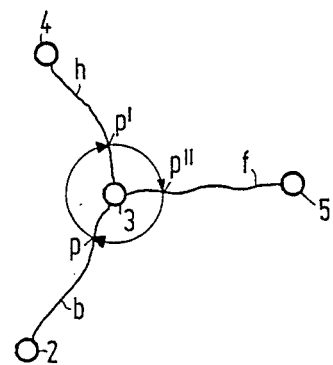
FIG. 2 shows a part of the network of FIG. 1.

FIG. 2 shows a part of the network shown in FIG. 1. The 1-cell b and the associated second 0-cell 3 in FIG. 2 will be considered. The thread pointer to be assigned to the second 0-cell 3 is obtained by rotating a point P, associated with the 1-cell b and situated near the 0-cell 3, clockwise around an axis (not shown in the Figure) which extends through the 0-cell 3 and is substantially perpendicular to the plane formed by the network. The point P is rotated around said axis until it coincides with a point of a next 1-cell. The thread pointer to be assigned then indicates the 1-cell thus obtained. The rotation results in a point P' which is situated on the 1-cell h and near the 0-cell 3. The 1-cell h, therefore, is the first 1-cell obtained by rotating the point P associated with the 1-cell b in the predetermined direction. The thread pointer assigned to the 0-cell 3 associated with the 1-cell b thus indicates the 1-cell h. The result is given in table I. Analogously, a thread pointer which indicates the 1-cell f is assigned to the 1-cell h associated with the 0-cell 3. This is because clockwise rotation of P' results in point P'' associated with the 1-cell f. Thus, for each 1-cell a thread pointer is assigned to its associated first 0-cell and second 0-cell. The various thread pointers are shown in FIG. 6a.

The importance of defining a predetermined direction of rotation will be illustrated on the basis of the following example. For example, select the 1-cell h; the 0-cell 4 is the starting intersection thereof and hence the first 0-cell, because this is the intersection having the smallest X-value. The thread pointer assigned to the 0-cell 4 for the 1-cell h indicates the 1-cell c when it is rotated clockwise. The second 0-cell associated with the 1-cell h is the 0-cell 3 and the thread pointer assigned thereto indicates the 1-cell f. However, if counter-clockwise rotation were chosen, the thread pointer assigned to the 0-cell 4 of the same 1-cell h would indicate the 1-cell g and the thread pointer assigned to the 0-cell 3 would indicate the 1-cell b. It follows therefrom that, when a different direction of rotation is chosen, obviously different thread pointers will be assigned. Thus, it is important to define the direction of rotation before drafting the memory table as given in table I in order to define an unambiguous choice of thread pointers.

For each 1-cell the table I also contain the 2-cell situated to the left and the right of the relevant 1-cell. For example, for the 1-cell d the 2-cell B is situated to the left of this 1-cell and the 2-cell E is situated to the right of the 1-cell d. The terms left and right are defined by traversing the relevant 1-cell from the starting point to the end point. When proceeding from the starting point (0-cell 2) of the 1-cell d to the end point (0-cell 6), the 2-cell B will be situated at the left and the 2-cell E will be situated at the right.

In this table the data of the topological network is thus stored in a compact and orderly manner. Moreover, a relation between the various cells is established by the use and the choice of the thread pointer.

Figure 3:
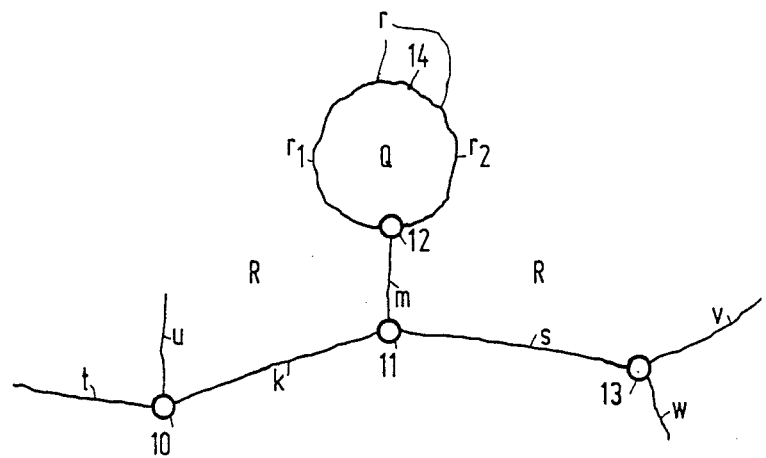
FIG. 3 shows an example of a topological network comprising a closed loop.

A particular case occurs when a 1-cell is formed by a closed loop. The starting point and the end point then coincide so that the first 0-cell and the second 0-cell are identical. FIG. 3 shows an example of a topological network which contains a closed loop. For the 1-cell r, the starting point and the end point coincide in the 0-cell 12 which forms a junction 0-cell between the closed loop 3 and the 1-cell m of the network. When the network shown in FIG. 3 is digitally stored in a memory by means of the described method, there will be obtained a 1-cell table such as the FIG. 6.b1. For the 1-cell r the first 0-cell (12) is the same as the second 0-cell and, moreover, the thread pointer assigned to the first 0-cell also indicates the 1-cell r. The search for a 2-cell will then give rise to problems as will be described hereinafter. An alternative method for storing such a network comprising a closed loop consists in that a virtual 0-cell is included in the loop, which virtual 0-cell fictitiously subdivides the loop into two parts. In FIG. 3 the 1-cell r includes a virtual 0-cell 14 which subdivides the 1-cell $r$ into two sub-1-cells $r_1$ and $r_2$. The relevant 1-cell table is the FIG. 6c. For the 1-cell r there are now included two 1-cells, i.e. $r_1$ and $r_2$, which comprise different first and second 0-cells. The first and the second 0-cell of the 1-cell $r_1$ are the 0-cells 12 and 14, respectively, and the 0-cells 14 and 12 are the first and the second 0-cell, respectively, of the 1-cell $r_2$. The problem imposed by the same first and second 0-cells for one and the same 1-cell is thus solved. The consequences thereof for the searching of a 2-cell enclosed by 1-cells and 0-cells will be described hereinafter.

It will be apparent that the storage of a topological network in a memory table by means of the described method has consequences for the searching of a 2-cell of the network by means of 0-cells and 1-cells. The searching of such a 2-cell takes place, for example in a vehicle navigation system in order to determine on which road of the network the vehicle is present.

In the method in accordance with the invention there is formed a first set by taking a first 1-cell and an associated 0-cell, for example the intersection (0-cell) and the adjoining road taken by the vehicle in the case of a navigation system. In order to illustrate the method in accordance with the invention, for example the first set is taken as the 0-cell 3 and the 1-cell h (h, 3). From the first set there is formed a second set by choosing the other 0-cell associated with the first 1-cell of the first set, and also the 1-cell indicated by the thread pointer assigned to said other 0-cell. In the case of the present example (h, 3), the 0-cell 4 is the other 0-cell (differing from the 0-cell 3) associated with the 1-cell h, and the thread pointer assigned to the 0-cell 4 indicates the 1-cell c as appears from the table I. Thus, in the present example the second set is formed by (c, 4). This second set in its turn is used to form a third set, that is to say by using the 1-cell indicated in the second set as the address for addressing the memory location in the table used for that 1-cell. In order to form the third set, from the addressed memory location there is fetched the 0-cell other than that indicated in the second set and also the thread pointer assigned to said other 0-cell. In the present example (second set )c, 4)) this means that the memory location c is addressed. At this memory location c, said other 0-cell is formed by the 0-cell 1, because the 0-cell 4 belongs to the second set. To this 0-cell 1 there is assigned a thread pointer which indicates the 1-cell a. The third set is now formed by (a, 1).

After the formation of the third set it is tested whether this third set does not correspond to the first set in order to determine whether the contours of the 2-cell to be found have not yet been determined. If this is not the case, the second set formed is buffered and the second set is substituted by the third set. The described operation for the second set is then repeated with the substituted second set until there is obtained a further third set which corresponds to the first set.

In the above example, the third set (a, 1) formed does not correspond to the first set (h, 3), so that the second set (c, 4) is buffered and the third set (a, 1) becomes the second set by substitution. On the basis of the substituted second set (a, 1) there is formed a new third set (b, 2) memory location 1, 2 is the 0-cell other than 1). Because (b, 2)≠(h, 3), (a, 1) is buffered. The substituted second set (b, 2) subsequently produces a third set (h, 3). Because the third set (h, 3)=(h, 3), the first set, the 2-cell is formed. Using the buffered second sets it has thus been determined that the 2-cell is formed by the sets (h, 3), (c, 4), (a, 1) and (b, 2).

The contours of the desired 2-cell having been found, it can simply be determined, using the information 2-cell left, 2-cell right stored in the memory table (FIG. 6a), for which 2-cell the contours have been found. This is because, as has already been described, the information 2-cell left, 2-cell right is coupled to the starting point and the end point of the 1-cell for which this information is stored. Therefore, when a first set is presented, it suffices to check in the memory table whether the 0-cell included in the first set is the starting point or the end point of the 1-cell indicated in the first set. If the 0-cell included in the first set is the starting point, the 2-cell left is found because the 2-cell is contoured counterclockwise. However, if the 0-cell included is the end point, the 2-cell right is found. In the present example (first set (h, 3)) the 0-cell 3 is the end point of the 1-cell h and, as appears from FIG. 1 and table I, the 2-cell right is found, being the 2-cell A.

The method described above can also be used for finding the other 2-cell adjoining the 1-cell of the first set. For this purpose is suffices the replace the 0-cell indicated in the first set by the other 0-cell associated with the given 1-cell and to repeat the method by means of the new first set thus obtained. In the example using the first set (h, 3), the 1-cell h is then addressed. At the addressed memory location it is then stated that the 0-cell 4 is the other 0-cell associated with the 1-cell h. The new first set is then formed by (h, 4). The first set (h, 4) then results in a second set (f, 3) which in its turn produces a third set (g, 5). Because (g, 5)≠(h, 4), a further third set (h, 4) is found on the basis of (g, 5). Because (h, 4)=(h, 4), the 2-cell C is found.

Let us again consider the network shown in FIG. 3 and the associated 1-cell table of FIG. 6b. Assume that a 2-cell which is bounded inter alia by the 1-cell k is to be found. (k, 10) then forms a first set. This first set produces a second set (m, 11) which itself produces a third set (r, 12). Because (r, 12) deviates from (k, 10), a further third set must be formed on the basis of the substituted second set (r, 12). To this end, the memory location r is addressed and the 0-cell other than the 0-cell 12 associated with the 1-cell r must be selected. However, this other 0-cell is also the 0-cell 12, because the first and the second 0-cell of the 1-cell r are identical, that is to say 0-cell 12. This means that the selection of said other 0-cell cannot be unambiguously performed, because the set (r, 12) as well as the set (m, 12) satisfies the requirements for determining the further third set. However, the selection of the set (r, 12) would cause an infinite circulation in the loop r, because the second set (r, 12) would continuously produced a third set (r, 12) identical to the second set. In this way the desired 2-cell, in this case the 2-cell R would never be found.

This problem, however, can be simply solved by introducing a verification step in the search method for a 2-cell. This is because such closed loops can be readily recognized, when stored in accordance with the table II, because of the fact that the first and the second 0-cell associated with such a 1-cell, representing a loop, are identical. Identicalness can be simply verified; it suffices to verify, after the addressing of the 1-cell given in a set, whether the first and the second 0-cell for the addressed 1-cell are identical. When the two 0-cells are identical, that combination (0-cell, thread pointer) whose thread pointer indicates a 1-cell other than the addressed 1-cell must be chosen as the set.

This verification step will be described with reference to the present example (first set (k, 10)). When the third set is formed, the verification step produces a negative result because for the 1-cell m the 0-cells 11 and 12 are different. However, for the formation of the further third set on the basis of the substituted second set (r, 12), it is found, after the addressing of the 1-cell r, that the first 0-cell 12 is the same as the second 0-cell 12. As a result of this correspondence, the combination (m, 12) must be chosen as the further third set, because the 1-cell m indicated by the thread pointer assigned to the second 0-cell deviates from the addressed 1-cell r. On the basis of the substituted second set (m, 12), the further third set (s, 11) is thus found. Infinite circulation in a closed loop is thus avoided.

The verification whether the first and the second 0-cell associated with one and the same 1-cell are the same may also be performed for searching the second set on the basis of the first set. When the 1-cell given in the first set is then addressed, subsequently a verification step may take place. This is advantageous notably when the 2-cell to be searched is formed by a closed loop, for example the 2-cell Q enclosed by the 1-cell r (FIG. 3). Starting with a first set (r, 12) it follows immediately from the data of the 1-cell r that the first and the second 0-cell are identical so that it can be immediately determined that a closed loop is concerned. Formation of the second set is then no longer necessary when the 2-cell Q is searched (2-cell right), because the information follows directly from the table.

The use of a verification step is necessary if a closed loop is indeed stored as a 1-cell having identical first and second terminating 0-cells. However, when a virtual 0-cell is inserted in the loop, a table such as the FIG. 6c is obtained and the problem imposed by the identical first and second 0-cell is solved. This implies that the verification step is superfluous if virtual 0-cells are used. Again considering the example involving the first set (k, 10) but now the table III, the following second and third sets are formed: (m, 11), (r$_1$, 12), (r$_2$, 14), (m, 12), (s, 11), (v, 13). As a result of the introduction of the virtual 0-cell 14, subdividing the 1-cell r into the sub-1-cells r$_1$ and r$_2$, the problem of circulation in a closed loop no longer occurs when a 2-cell is searched, and the verification can be omitted.

As has already been stated, the described methods are very well suitable for use in a vehicle navigation system. On the one hand, the compact method of storing the network data in the memory limits the memory space required, as a result of which the read operation requires only little time. The latter is important notably when the vehicle travels at a comparatively high speed. On the other hand, an efficient method for finding a 2-cell is of essential importance for the navigation itself.

Figure 4:
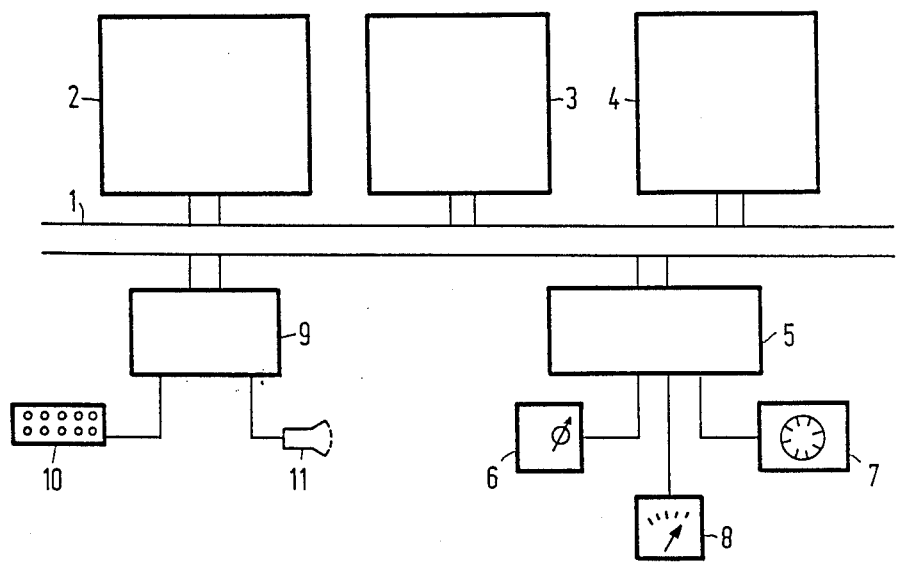
FIG. 4 diagrammatically shows the major components of an embodiment of a vehicle navigation system.

FIG. 4 diagrammatically shows the major components of an embodiment of a vehicle navigation system. The vehicle navigation system comprises a bus 1 whereto there are connected a data processing unit 2, for example a miroprocessor, and also a working memory 3 and a storage memory 4. The storage memory is formed, for example by an optical disc and an associated read member. In the storage memory there are stored map data, navigation data and other control data. A memory table such as the tables of FIGS. 6a, 6b or 6c is stored in the memory 4. A first input/output interface (5) and a second input/output interface (9) are also connected to the bus 1. To the first interface 5 there are connected, for example an electromagnetic compass 6, wheel sensors 7 and an odometer 8. The elements 6, 7, 8 serve to record data in order to enable position determination of the vehicle. The determination of a vehicle position by means of a navigation system is described, for example in the article "EVA-Ortungs- und Navigationssystem für Landfahrzeuge" by E. P. Neukirchner, O. Pilsak und D. Schlögl, published in Nachrichtenzeitschrift Bd 36 (1983), Vol. 4, pages 214–218. Because the invention does not relate to the determination of the position coordinates of the vehicle, this aspect will not be elaborated herein. A keyboard 10 and a reproduction element 11 are connected to the second input/output interface. The keyboard 10 is used inter alia for inputting the starting point and a destination for the system. The reproduction element 11 is formed, for example by a loudspeaker and/or a television monitor.

When the vehicle navigation system is in operation, coordinates which represent the position of the vehicle are determined repeatedly on the basis of the data recorded by the compass 6, the wheel sensors 7 and odometer 8, the operation being controlled by the microprocessor 2. On the basis of these position coordinates, the navigation system must determine the 0-cell, 1-cell or 2-cell with which these position coordinates are associated. A method of determining to which road segment, i.e. with which 0-cell or 1-cell position coordinates are associated, is disclosed, for example in PCT application no WO 86/00157. By using the method disclosed therein, the navigation system can thus determine a first set on the basis of the position coordinates. Utilizing a method in accordance with the invention, the navigation system is also capable of establishing within which 2-cell the position coordinates are situated. This is necessary, for example, when the position coordinates excessively deviate from a position on the road.

When the navigation system requires a 2-cell which is bounded by 0-cells and 1-cells, it will produce a first set on the basis of the position coordinates and also, if desired, a request for finding the 2-cells to the left as well as to the right of the 1-cell given in the first set.

Figure 5:
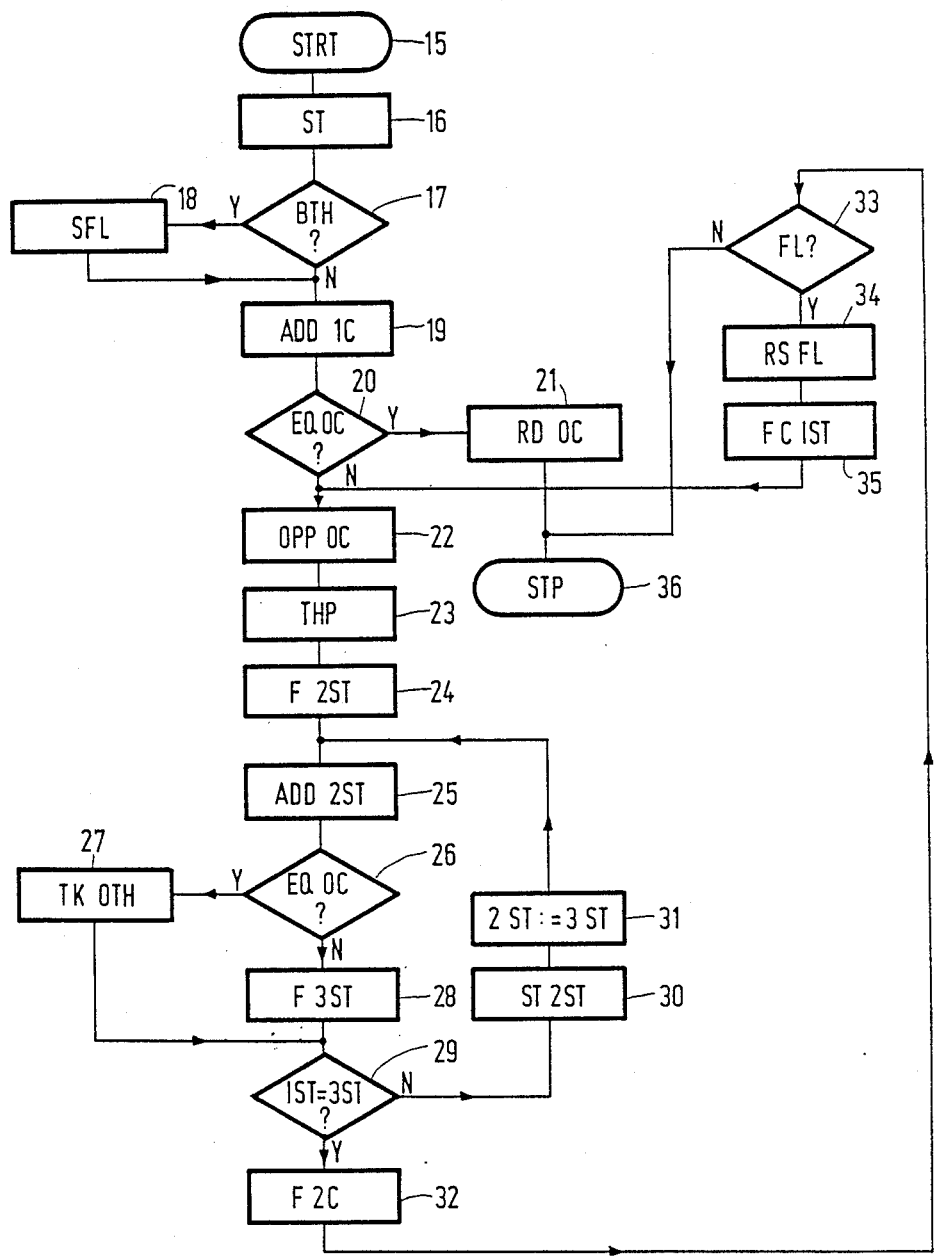
FIG. 5 shows a flowchart for an example of a program for searching the 1-cells and 0-cells which bound a 2-cell.

FIG. 5 shows, in the form of a flowchart, an example of a program which is executed under the control of a data processing unit in order to find a 2-cell from the memory on the basis of a first set presented. The various steps of the flowchart will be described hereinafter.

15 STRT : this is the start of the program which is initiated each time when a first set is presented.

16 ST : the first set is stored in a predetermined location in the working memory.

17 BTH? : during this step it is checked whether both 2-cells adjoining the 1-cell given in the first set (left and right) are desired. This request is formulated by the navigation system itself. For example, when the vehicle is present within a built-up area, always both adjoining 2-cells may be requested.

18 SFL : when both adjoining 2-cells are requested, a flag is set in an appropriate register.

19 ADD 1C : the 1-cell given in the first set is addressed in the memory table and the data stored at the addressed location is fetched and written into the working memory.

20, 26 EQ 0C? : during this step it is checked whether the addressed 1-cell has identical first and second 0-cells. It is to be noted that this step is necessary only if no virtual 0-cells are used as described above. When virtual 0-cells are used, this step can be dispensed with and also the below steps 21 and 27.

21 RD 0C : the new 1-cell given in the first set has identical first and second 0-cells. Therefore, the addressed 1-cell forms a closed loop and the enclosed 2-cell can be fetched directly from the addressed data.

22 OPP 0C : the 0-cell other than the one indicated in the first set and belonging to the addressed 1-cell is identified.

23 THP : the thread pointer assigned to said other 0-cell is fetched.

24 F 2ST : the second set is now formed by the thread pointer just fetched and by said other 0-cell.

25 ADD 2ST : the 1-cell given in the second set is addressed in the memory table and the data stored therein is fetched and written into the working memory.

27 TK OTH : the 1-cell given in the second set has identical first and second 0-cells. The 0-cell whereto a thread pointer has been assigned which indicates a 1-cell other than that given in the second set is now selected and the third set is formed by said selected 0-cell and the 1-cell indicated by the thread pointer assigned to said selected 0-cell.

28 F 3ST : the third set is formed on the basis of the data of the second set.

29 1ST=3ST? : this is a check in order to determine whether the third set is the same as the first set.

30 ST 2ST : the second set formed during the step 24 is stored in a reserved location in the working memory.

31 2ST:=3ST : the third set formed during the step 28 now becomes the second set used to repeat the steps 25 to 28.

32 F 2C : the 2-cell is now formed on the basis of the first, second and third sets formed.

33 FL? : in this step it is checked whether a flag has been set during the step 18, indicating that both 2-cells are requested.

34 RS FL : if the flag was set, it is now reset.

35 F CIST : a complementary first set is now formed by the 1-cell indicated in the first set and the 0-cell other than the indicated 0-cell, utilizing the data of the first set stored in the working memory.

36 STP : this is the end of the program.

The 2-cell thus found can be reproduced, if desired, on the display screen of the reproduction element under the control of the microprocessor. The navigation system now has the 2-cell data available for realizing its navigation task.

What is claimed is:

1. A method for storing digital data of a surface-wise-organized topological network in a memory, which network contains a set of 0-cells and 1-cells, each given 1-cell having a memory location for storing data representing a first and a second 0-cell terminating said given 1-cell, inclusive of a thread pointer data per 0-cell, that indicates a single further 1-cell terminated by the 0-cell in question, each given 0-cell terminating a subset of 1-cells arranged in a sequence of successive orientations, characterized in that said thread pointer data indicates a 1-cell of next-following orientation in the subset according to a particular sense of rotation, and in that said sense is uniform for all 0-cells in the set.

2. A data processing unit comprising a memory storing digital data representing a surface-wise-organized topological network, which network contains a set of 0-cells and 1-cells; each 1-cell being stored in a memory location at which data is also stored representing a first and a second 0-cell terminating such 1-cell, and thread pointer data for each 0-cell which indicates a single further 1-cell terminated by such 0-cell, each 0-cell terminating a subset of 1-cells arranged in a sequence of successive orientations; said thread pointer data indicating a 1-cell of next-following orientation in said subset according to a particular sense of rotation, such sense of rotation being uniform for all 0-cells in said set of 0-cells and 1-cells.

3. A method as claimed in claim 1, wherein said network furthermore contains a further set of 2-cells, characterized in that the memory location for said given 1-cell also contains an identification data identifying first and second 2-cells bounded by said given 1-cell.

4. A method as claimed in claim 3 for finding the 1-cells and the 0-cells which bound a particular 2-cell, characterized in that, on the basis of a first set formed by a first 1-cell of the network and one of its terminating 0-cells, there is formed a second set by addressing said first 1-cell in the memory and by selecting the other 0-cell terminating said first 1-cell and also the 1-cell indicated by the thread pointer assigned to said other 0-cell, said second set being used to form a third set by addressing the 1-cell of the second set in the memory, by taking that 0-cell terminating the addressed 1-cell which is not the 0-cell used for the second set, and by taking the 1-cell indicated by the thread pointer assigned to the latter other 0-cell, which third set is subsequently compared with the first set and, in the case of correspondence, the searched 2-cell is bounded by the first and the second set, while in the case of non-correspondence the second set is buffered and subsequently substituted by the third set in order to form, on the basis of the substituted second set, a further third set, which operations are repeated until the first set corresponds to a third set thus formed.

5. A method as claimed in claim 3 for finding the 1-cells and the 0-cells which bound 2-cell, characterized in that a second set is formed on the basis of a first set formed by a first set formed by a first 1-cell of the network and one of its terminating 0-cells by addressing said first 1-cell in the memory and by selecting the other 0-cell terminating said first 1-cell and also the 1-cell indicated by the thread pointer assigned to said other 0-cell, the 1-cell of the second set being subsequently addressed in the memory and the data fetched being examined in order to determine whether the first and the second 0-cell terminating the relevant 1-cell are identical, a third set being formed when the first and the second 0-cell are identical, which third set is formed by selecting the identical 0-cell and also the 1-cell, indicated by the thread pointer assigned to one of the two 0-cells, which differs from the 1-cell of the second set, in the case of non-identical first and second 0-cells the third set being formed by taking the other 0-cell terminating the addressed 1-cell which is not the 0-cell used in the second set and by taking also the 1cell indicated by the thread pointer assigned to the latter other 0-cell, which third set is subsequently compared with the first set and, in the case of correspondence, the 2-cell searched is bounded by the first, the second and the third set, while in the case of non-correspondence the second set is buffered and subsequently substituted by the third set in order to form a further third set on the basis of the substituted second set, said operations being repeated until the first set corresponds to a third set thus formed.

6. A method as claimed in claim 5, characterized in that the first 1-cell of the first set in the memory is addressed, the data fetched being examined in order to determine whether the first and the second 0-cell terminating the first 1-cell are identical, in the case of identical first and second 0-cells the 2-cell to be found being that one which is enclosed by the first 1-cell.

7. A method as claimed in any one of the claims 4, 5 or 6 where for each 1-cell the terminating 0-cells are arranged as a first and a second 0-cell, and for each 1-cell there is included an indication for a first and a second 2-cell, characterized in that, when the 0-cell indicated in the first set is the first or the second 0-cell of the 1-cell included in the first set, the 2-cell to be found is represented by the first and the second 2-cell, respectively, indicated for the relevant 1-cell.

8. A method as claimed in claim 1, 3, 4, 5 or 6 used for a topological network comprising at least one 1-cell which is formed by a closed loop, characterized in that a virtual 0-cell is provided at a point of a closed loop, which point differs from a junction 0-cell which indicates the connection of the relevant closed loop to a further 1-cell of the network, the closed loop being stored as a first and a second sub-1-cell, the first and the second 0-cell indicated for the first sub-1-cell being formed by the junction 0-cell and the virtual 0-cell, respectively, the first and the second 0-cell indicated for the second sub-1-cell being formed by the virtual 0-cell and the junction 0-cell respectively.

9. A data processing unit as claimed in claim 2, wherein said network further contains at least one 1-cell which is formed by a closed loop, characterized in that a virtual 0-cell is provided at a point of said closed loop, which point differs from a junction 0-cell which indicated the connection of said closed loop to a further 1-cell of the network, the closed loop being stored as a first and a second sub-1-cell, the first and the second 0-cells each terminated by first and second 0-cells, terminating the first sub-1-cell being the junction 0-cell and the virtual 0-cell, respectively, the first and the second 0-cells terminating the second sub-1-cell being the virtual 0-cell and the junction 0-cell respectively.

10. A data processing unit as claimed in claim 2 or 9, wherein said network further contains a set of 2-cells, characterized in that at the memory location for each given 1-cell there is further stored identification data identifying first and second 2-cells as bounded by such 1-cell.

* * * * *